(12) United States Patent
Kim et al.

(10) Patent No.: US 7,453,948 B2
(45) Date of Patent: Nov. 18, 2008

(54) APPARATUS AND METHOD FOR TRANSMITTING/RECEIVING DATA USING A MULTIPLE ANTENNA DIVERSITY SCHEME IN A MOBILE COMMUNICATION SYSTEM

(75) Inventors: Noh-Sun Kim, Suwon-si (KR); Hun-Kee Kim, Seoul (KR); Gin-Kyu Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 606 days.

(21) Appl. No.: 10/855,894

(22) Filed: May 28, 2004

(65) Prior Publication Data

US 2005/0031050 A1    Feb. 10, 2005

(30) Foreign Application Priority Data

May 29, 2003    (KR) ...................... 10-2003-0034456

(51) Int. Cl.
*H04B 7/02* (2006.01)
*H03C 7/02* (2006.01)
(52) U.S. Cl. ...................................... 375/267; 455/101
(58) Field of Classification Search ................ 375/267, 375/347, 346, 299; 455/101, 132, 504
See application file for complete search history.

(56) References Cited

U.S. PATENT DOCUMENTS

| | | | |
|---|---|---|---|
| 7,107,021 B2 * | 9/2006 | Kim et al. ................... | 455/101 |
| 2002/0012380 A1 * | 1/2002 | Hottinen et al. ............. | 375/130 |
| 2003/0026349 A1 * | 2/2003 | Onggosanusi et al. ....... | 375/267 |
| 2004/0105489 A1 * | 6/2004 | Kim et al. ................... | 375/140 |
| 2004/0184398 A1 * | 9/2004 | Walton et al. ............... | 370/203 |

* cited by examiner

*Primary Examiner*—Khai Tran
(74) *Attorney, Agent, or Firm*—Roylance, Abrams, Berdo & Goodman, LLP

(57) ABSTRACT

An apparatus and method for transmitting/receiving data using a multiple antenna scheme in a mobile communication system are provided. First and second code symbol sequences are generated by encoding a data symbol sequence for transmission in a predetermined encoding method. Transmission of the two code symbol sequences through the first and second transmit antennas is controlled such that if the data symbol sequence is initially transmitted, the first code symbol sequence is transmitted through the first transmit antenna and the second code symbol sequence is transmitted through the second transmit antenna and, if the data symbol sequence is retransmitted, the first code symbol sequence is transmitted through the second transmit antenna and the second code symbol sequence is transmitted through the first transmit antenna.

14 Claims, 5 Drawing Sheets

APPARATUS AND METHOD FOR TRANSMITTING/RECEIVING DATA USING A MULTIPLE ANTENNA DIVERSITY SCHEME IN A MOBILE COMMUNICATION SYSTEM

PRIORITY

This application claims priority under 35 U.S.C. § 119(a) to an application entitled "Apparatus and Method for Transmitting/Receiving Data Using Multiple Antenna Diversity Scheme in a Mobile Communication System" filed in the Korean Intellectual Property Office on May 29, 2003 and assigned Serial No. 2003-34456, the entire contents of which are incorporated herein by reference.

BACKGROUND OF THE INVENTION

1. Field of the Invention

The present invention relates generally to a mobile communication system. In particular, the present invention relates to an apparatus and method for transmitting/receiving data using a multiple antenna diversity scheme.

2. Description of the Related Art

Mobile communication systems have evolved from voice communication systems to packet service communication systems. The packet service communication systems transmit burst packet data to multiple mobile stations. They are designed for large-volume data transmission. These packet service communication systems have been developed for high-speed packet service. To provide the high-speed packet service, a standardization working group for asynchronous systems, $3^{rd}$ Generation Partnership Project (3GPP) proposed High Speed Downlink Packet Access (HSDPA), whereas a standardization working group for synchronous systems, $3^{rd}$ Generation Partnership Project2 (3GPP2) proposed 1× Evolution Data Only (1×EV-DO) and 1× Evolution Data and Voice (1×EV-DV). HSDPA, 1×EV-DO and 1×EV-DV all support high-speed packet transmission to ensure reliable internet service such as the Web. For high-speed packet service, both circuit data transmission such as voice service and packet data transmission are actively provided by optimizing peak throughput as well as average throughput.

HSDPA will now be described. HSDPA is a generic term referring to devices, systems and methods using the High Speed-Downlink Shared CHannel (HS-DSCH) for supporting downlink packet data transmission at a high rate and its related control channels in Wideband-Code Division Multiple Access (W-CDMA). HSDPA, which was proposed by the 3GPP and adopted as the standard for $3^{rd}$ generation asynchronous mobile communication systems, will be described by way of example.

Three techniques were introduced into the HSDPA communication system to support high-speed packet data transmission: Adaptive Modulation and Coding (AMC), Hybrid Automatic Retransmission Request (HARQ), and Fast Cell Select (FCS).

AMC: A modulation scheme and a coding method are selected for a data channel according to the channel condition between a cell, namely a Node B and a User Equipment (UE), to thereby increase the bandwidth efficiency of the entire cell. Modulation schemes and codings are used in combination. Each modulation and coding combination is termed a Modulation and Coding Scheme (MCS). MCSs can be labeled from level 1 to level N. A data channel signal is modulated and encoded by an MCS chosen adaptively according to the channel condition between the UE and its communicating Node B. Thus, the system efficiency of the Node B is increased.

HARQ, especially N-channel Stop And Wait HARQ (SAW HARQ): In accordance with a typical Automatic Retransmission Request (ARQ), Acknowledgement (ACK) signals and retransmission packet data are exchanged between a UE and an Radio Network Controller (RNC). Meanwhile, the HARQ scheme adopts the following two novel procedures to increase ARQ transmission efficiency. One is to exchange a retransmission request and its related response between a UE and a Node B, and the other is to temporarily store bad data and combine the stored data with a retransmitted version of the data. In the HSDPA communication system, ACK signals and retransmission packet data are exchanged between the UE and the MAC HS-DSCH of the Node B, and the N-channel SAW HARQ establishes N logical channels and transmits a plurality of packets without receiving an ACK signal for a previously transmitted packet. As compared to the N-channel SAW HARQ, SAW ARQ requires reception of an ACK signal for a previously transmitted packet data in order to transmit the next packet data. Thus the ACK signal for the previous packet must be received despite the capability of transmitting the current packet data. On the contrary, the N-channel SAW HARQ allows transmission of successive packets without receiving the ACK signal for the previously transmitted packet data, resulting in an increase in the channel use efficiency. That is, N logical channels, which can be identified by times or channel numbers assigned to them, are established between the UE and the Node B, so that the UE can determine the channel that has delivered a received packet and take appropriate measures such as the rearrangement of packets in the right order or soft combing of corresponding packet data.

FCS: When a UE supporting HSDPA is positioned in a soft handover region, it quickly selects a cell with a good channel condition. Specifically, if the UE enters a soft handover region between a first Node B and a second Node B, it establishes radio links with a plurality of Node Bs. A set of Node Bs with which the radio links are established are called an active set. The UE receives HSDPA packet data only from the cell with the best channel condition, thus reducing whole interference. The UE also monitors channels from the active Node Bs periodically. In the presence of a cell with a better channel condition than the current best cell, the UE transmits a best cell indicator (BCI) to all the active Node Bs to substitute the new best cell for the old best cell. The BCI includes the ID of the new best cell. The active Node Bs check the cell ID included in the received BCI and only the new best cell transmits packet data to the UE on the HS-DSCH.

As described above, many novel techniques were proposed in order to increase the data rate in the HSDPA communication system. Like HSDPA, 1×EV-DO and 1×EV-DV were designed to increase data rates. Hence, increasing data rates is a challenging issue. Aside from AMC, HARQ, and FCS, a multiple antenna scheme is used to increase data rates. Since the multiple antenna scheme works in the space domain, it overcomes the problem of limited bandwidth resources in the frequency domain.

The multiple antenna diversity scheme will now described.

In a radio channel environment, a mobile communication system suffers signal distortion because of various factors such as multi-path interference, shadowing, propagation attenuation, time-varying noise, and interference. Fading caused by the multi-path interference is closely associated with reflective objects or the mobility of a user, that is, the mobility of a UE. The fading results in mixed reception of an actual transmission signal and an interference signal. The received signal has serious distortion, which degrades the whole mobile communication system performance. Fading is a serious obstacle to high-speed data communication in a radio channel environment in that the fading results in distortion in the amplitude and phase of the received signal. Many studies are being conducted to overcome fading. Thus, the mobile communication system must minimize the loss inherent to radio channels, such as fading, and user interference in order to transmit data at high rates. Diversity is used as a solution to fading. Amongst diversity schemes, space diversity uses multiple antennas.

Transmit antenna diversity has emerged as an effective way to combat fading. The transmit antenna diversity scheme receives a plurality of transmission signals experiencing independent fading under the radio channel environment and copes with fading-caused distortion. The transmit antenna diversity is classified into time diversity, frequency diversity, multi-path diversity, and space diversity. In other words, the mobile communication system must overcome fading that seriously influences communication performance in order to carry out high-speed data transmission reliably. Fading reduces the amplitude of a received signal by several decibels to tens of decibels. Hence, the above-described diversity schemes are adopted to combat fading. For example, a Code Division Multiple Access (CDMA) communication system uses a rake receiver for implementing diversity reception based on the delay spread of a channel. The rake receiver provides diversity gain for received multi-path signals. However, if a channel delay spread is relatively small, the rake receiver cannot offer a desired diversity gain.

Time diversity effectively copes with burst errors generated in the radio channel environment by use of interleaving and coding. Typically, the time diversity applies to a Doppler spread channel. A distinctive shortcoming of the time diversity is that it is difficult to achieve the diversity effect from a slow-fading Doppler channel.

Space diversity is used for a channel having a small delay spread, for example, an indoor channel and a pedestrian channel being a slow fading Doppler channel. The space diversity scheme achieves diversity gain by use of two or more antennas. If a signal transmitted through one antenna is attenuated by fading, diversity gain is obtained by receiving signals transmitted through the other antennas. The space diversity is branched into receive antenna diversity using a plurality of receive antennas and transmit antenna diversity using a plurality of transmit antennas. Considering the difficulty in adopting receive diversity for a UE in terms of hardware miniaturization or manufacturing cost, a transmit antenna is recommended for a Node B.

Frequency diversity achieves diversity gain from signals transmitted with different frequencies and propagated in different paths. In this multi-path diversity scheme, the multi-path signals have different fading information. Therefore, diversity is obtained by separating the multi-path signals.

To solve the above-described problems, methods have been proposed in which the same diversity gain is obtained as if a plurality of receive antennas were used to combat fading on a radio channel e.g., a Node B transmits a signal through a plurality of transmit antennas and a UE receives the signal through one or two receive antennas. Techniques of implementing space diversity using two or more transmit antennas are attracting much interest for the future generation mobile communication system proposed by the 3GPP. Such a transmit antenna diversity scheme can be implemented in a closed loop or an open loop.

The closed loop transmit antenna diversity differs from the open loop in that a UE provides back downlink channel information to a Node B in the former, while the feedback information is not required in the latter. Space Time Transmit Diversity (STTD), a kind of space diversity, is a major open-loop transmit antenna diversity technique. In STTD, space-time coding is used instead of information about radio channel status.

A major closed-loop transmit antenna diversity scheme is Transmit Antenna Array (TxAA) that uses feedback information about radio channel status received from a UE. While the present invention is applicable to all mobile communication systems adopting diversity schemes using multiple antennas and HARQ as well as open-loop transmit diversity and closed-loop transmit diversity, it will be described in the context of the open-loop transmit diversity.

With reference to FIG. 1, the structure of a transmitter in a mobile communication system using the multiple antenna diversity scheme will be described.

FIG. 1 is a block diagram of a transmitter in a mobile communication system using a conventional multiple antenna diversity scheme.

It is assumed that the exemplary transmitter described herein supports Double Space Time Transmit Diversity (DSTTD). DSTTD is an extension of STTD. It offers a higher space diversity gain than STTD. Referring to FIG. 1, the transmitter typically comprises a Cyclic Redundancy Check (CRC) adder 111, a turbo encoder 113, a rate matcher 115, an interleaver 117, a modulator 119, a serial-to-parallel converter (SPC) 121, STTD encoders 123 and 125, a plurality of spreaders 131, 141, 151 and 161, a plurality of transmit antennas 133, 143, 153 and 163, and an Adaptive Modulation and Coding Scheme (AMCS) controller 150.

For the input of information bits, the CRC adder 111 adds a CRC to the information bits, for an error check. The turbo encoder 113 turbo-encodes the signal received from the CRC adder 111. As can be appreciated, many acceptable coding schemes may be used in conventional devices, including, for example, convolutional encoding. The turbo encoder 113 encodes at a predetermined coding rate. The ratio between systematic bits and parity bits output from the turbo encoder 113 is determined according to the coding rate. For example, if the coding rate is a symmetric coding rate, ½ (r=½), the turbo encoder 113 outputs one systematic bit and one parity bit for the input of one bit. For another example, if the coding rate is an asymmetric coding rate, ¾ (r=¾), the turbo encoder 113 outputs three systematic bits and one parity bit for the input of three bits. Of course any acceptable coding rate may be employed. The rate matcher 115 punctures or repeats the coded bits received from the turbo encoder according to the transmission capacity of an actual physical channel in the mobile communication system. The interleaver 117 interleaves the output of the rate matcher 115 in a predetermined interleaving manner to prevent burst errors. The modulator 119 modulates the interleaved bits using a predetermined modulation scheme such as Binary Phase Shift Keying (BPSK), Quadrature Phase Shift Keying (QPSK), or 16 Quadrature Amplitude Modulation (16QAM). In 16QAM, four coded bits are mapped to one modulation symbol. In QPSK, two coded bits are mapped to one modulation symbol.

The SPC 121 converts a serial modulation symbol sequence to parallel symbol sequences. Specifically, the SPC 121 pairs every two modulation symbols received from the modulator 119 and provides every two modulation symbol pairs separately to the STTD encoders 123 and 125. The operations of the SPC 121 and the STTD encoders 123 and 125 will be detailed later. The STTD encoder 123 encodes the received modulation symbol pair in STTD and transmits the coded symbols to both the spreaders 131 and 141. The spreader 131 spreads the received symbols with a predetermined spreading code and transmits the spread symbols through the transmit antenna 133. The spreader 141 spreads the received symbols with a predetermined spreading code and transmits the spread symbols through the transmit antenna 143. The STTD encoder 125 encodes the received modulation symbol pair in STTD and transmits the coded symbols to both the spreaders 151 and 161. The spreader 151 spreads the received symbols with a predetermined spreading code and transmits the spread symbols through the transmit antenna 153. The spreader 161 spreads the received symbols with a predetermined spreading code and transmits the spread symbols through the transmit antenna 163.

The AMC controller 150 controls the operations of the rate matcher 115 and the modulator 119. The AMCS controller 150 determines a coding rate and a modulation scheme for the transmitter by considering the present radio channel status. For example, if the present radio channel status is relatively good, the AMCS controller 150 selects a higher coding rate and a higher-order modulation scheme, whereas if the present radio channel status is relatively bad, the AMCS controller 150 selects a lower coding rate and a lower-order modulation scheme. As stated earlier, because the coding rate of the turbo encoder 113 is fixed, the AMCS controller 150 controls the rate matcher 115 to match the number of the coded bits from the turbo encoder 113 to a coding rate determined in the AMCS controller 150. Also, the AMCS controller 150 controls the modulator 119 according to the selected modulation scheme. The AMCS controller 150 is aware of the radio channel status via signaling from a higher layer. In addition, the AMCS controller 150 controls data retransmission.

A detailed description will now be made below of the operations of the SPC 121 and the STTD encoders 123 and 125.

Although not shown, the four modulation symbols from the modulator 119 can be denoted as "$S_1, S_2, S_3$ and $S_4$". The SPC 121 parallelizes $S_1, S_2, S_3$ and $S_4$ and provides $S_1$ and $S_2$ to the STTD encoder 123 and $S_3$ and $S_4$ to the STTD encoder 125. The STTD encoders 123 and 125 encode $S_1$ & $S_2$ and $S_3$ & $S_4$ in STTD. After the STTD encoding, $(S_1, S_2)$ are transmitted in the form of $(S_1, S_2)$ and $(-S_2^*, S_1^*)$ as illustrated in Table 1 below.

TABLE 1

|  | t | t + T |
|---|---|---|
| Transmit antenna 133 | $S_1$ | $S_2$ |
| Transmit antenna 143 | $-S_2^*$ | $S_1^*$ |

As noted in Table 1, using STTD encoding, the STTD encoder 123 transmits $S_1$ through the transmit antenna 133 and $-S_2^*$ through the transmit antenna 143 at time t, and transmits $S_2$ through the transmit antenna 133 and $S_1^*$ through the transmit antenna 143 at time (t+T).

After the STTD encoding, $(S_3, S_4)$ are transmitted in the form of $(S_3, S_4)$ and $(-S_4^*, S_3^*)$ as illustrated in Table 2 below.

TABLE 2

|  | t | t + T |
|---|---|---|
| Transmit antenna 153 | $S_3$ | $S_4$ |
| Transmit antenna 163 | $-S_4^*$ | $S_3^*$ |

As noted in Table 2, using STTD encoding, the STTD encoder 125 transmits $S_3$ through the transmit antenna 153 and $-S_4^*$ through the transmit antenna 163 at time t, and transmits $S_4$ through the transmit antenna 153 and $S_3^*$ through the transmit antenna 163 at time (t+T). The structure of the transmitter in the mobile communication system using the multiple antenna diversity scheme has been described above in connection with FIG. 1. Now, the structure of a receiver in the mobile communication system using the multiple antenna diversity scheme will be described with reference to FIG. 2.

FIG. 2 is a block diagram of a receiver in the mobile communication system using a conventional multiple antenna diversity scheme.

The receiver illustrated in FIG. 2 is configured in relation to the transmitter illustrated in FIG. 1 so that it can receive DSTTD signals from the transmitter. Referring to FIG. 2, the exemplary conventional receiver comprises a plurality of receive antennas 211, 221, 231 and 241, a plurality of despreaders 213, 223, 233 and 243, STTD decoders 251 and 253, a parallel-to-serial converter (PSC) 255, a demodulator 257, a deinterleaver 259, a de-rate matcher 261, a combiner 263, a turbo decoder 265, and a CRC checker 267.

Signals received at the receive antennas 211, 221, 231 and 241 are applied to the input of the despreaders 213, 223, 233 and 243, respectively. That is, a signal received through the receive antenna 211 is provided to the despreader 213, a signal received through the receive antenna 221 is provided to the despreader 223, a signal received through the receive antenna 231 is provided to the despreader 233, and a signal received through the receive antenna 241 is provided to the despreader 243. The despreaders 213, 223, 233 and 243 despread their received signals using the spreading codes in the spreaders of the transmitter.

The STTD decoder 251 decodes the signals received from the despreaders 213 and 223 in STTD, and the STTD decoder 253 decodes the signals received from the despreaders 233 and 243 in STTD. These operations in the STTD decoders 251 and 253 will be detailed below.

Because the four STTD-encoded symbols illustrated in Table 1 and Table 2 are transmitted through the four transmit antennas as described with reference to FIG. 1, signals received at the receiver are expressed as $$r_1 = h_1 s_1 + h_2 s_2 + h_3 s_3 + h_4 s_4 + n_1$$

$$r_2 = -h_1 s_2^* + h_2 s_1^* - h_3 s_4^* + h_4 s_3^* + n_2 \quad (1)$$

where $r_1$ and $r_2$ are signals received at corresponding time points, $h_1, h_2, h_3$ and $h_4$ are channel responses from the four respective transmit antennas, and $n_1$ and $n_2$ are Additive White Gaussian Noise (AWGN).

The STTD decoder 251 decodes the received signals expressed as Eq. (1) in STTD and outputs signals expressed as $$\tilde{s}_1 = h_1^* r_1 + h_2 r_2^*$$

$$\tilde{s}_2 = h_2^* r_1 - h_1 r_2^* \quad (2)$$

and the STTD decoder 253 decodes the received signals expressed as Eq. (1) in STTD and outputs signals expressed as $$\tilde{s}_3 = h_3^* r_3 + h_4 r_4^*$$

$$\tilde{s}_4 = h_4^* r_3 - h_3 r_4^* \quad (3)$$

Eq. (1) and Eq. (2) are developed to $$\tilde{s}_1 = (\alpha_1^2 + \alpha_2^2) s_1 + n_1'$$

$$\tilde{s}_2 = (\alpha_1^2 + \alpha_2^2) s_2 + n_2'$$

$$\tilde{s}_3 = (\alpha_3^2 + \alpha_4^2) s_3 + n_3'$$

$$\tilde{s}_4 = (\alpha_3^2 + \alpha_4^2) s_4 + n_4' \quad (4)$$

where n is a noise component and $\alpha_j$ is a diversity gain obtained from a jth transmit antenna.

It is noted in Eq. (4) that signal components are separated from noise components and four signal components having diversity gains, $\tilde{s}_1, \tilde{s}_2, \tilde{s}_3, \tilde{s}_4$ are received.

Consequently, the STTD decoder 251 outputs $\tilde{s}_1$ and $\tilde{s}_2$ and the STTD decoder 253 outputs $\tilde{s}_3$ and $\tilde{s}_4$. Therefore, the PSC 255 serializes the signals received from the STTD decoders 251 and 253 and outputs $\tilde{s}_1, \tilde{s}_2, \tilde{s}_3, \tilde{s}_4$ to the demodulator 257. The demodulator 257 demodulates the received signal in relation to the modulation scheme used in the transmitter. The deinterleaver 259 deinterleaves the demodulated bits in correspondence with the interleaving method used in the transmitter. The de-rate matcher 261 de-rate matches the deinterleaved bits in relation to the rate matching performed in the transmitter.

The combiner 263 combines the present coded bits received from the de-rate matcher 261 with an already stored version of the coded bits. This means that data initially transmitted from the transmitter had errors and was not received normally. Therefore, if the receiver requests a retransmission and the transmitter retransmits the data, the retransmitted data is combined with the previous defective data in the combiner 263. If the present data is initial transmission data, the coded bits bypass the combiner 263 without being combined. The turbo decoder 265 turbo-decodes the signal received from the combiner 263 in relation to the turbo encoding performed in the transmitter. The turbo decoder 265 receives coded bits, that is, systematic bits and parity bits from the combiner 263 and decodes the systematic bits. The CRC checker 267 extracts CRC bits from the systematic bits (i.e. information bits) received from the turbo decoder 265 on a packet basis and determines whether the packet has errors based on the CRC bits. Determining that no errors occurred in the packet, the CRC checker 267 outputs the packet and transmits an ACK signal for the packet to the transmitter, indicating normal reception of the packet. On the contrary, if the CRC check result indicates an occurrence of errors in the packet, the CRC checker 267 transmits an NACK signal to the transmitter, requesting a retransmission of the defective packet.

If the CRC checker 267 outputs the ACK signal, a buffer in the combiner 263 is initialized, while coded bits stored in the buffer are deleted. On the other hand, if the CRC checker 267 outputs the NACK signal, the coded bits remain in the buffer of the combiner 263.

In case of data retransmission, $S_1$ and $S_2$ offer a diversity gain by $\alpha_1\alpha_2$ and $S_3$ and $S_4$ offer a diversity gain by $\alpha_3\alpha_4$. Because the transmitter transmits the same symbols through the same transmit antennas at an initial transmission and a retransmission, the receiver receives the symbols on channels in the same channel status at the initial transmission and retransmission. For example, if $S_1$ and $S_2$ are delivered on a channel in an error or distorted state and thus not received normally, the receiver requests a retransmission of $S_1$ and $S_2$. Then, the transmitter retransmits $S_1$ and $S_2$ through the same transmit antennas, that is, on the same channels. Hence, $S_1$ and $S_2$ are delivered again in error or distorted state, increasing an error probability. In this case, only part of whatever diversity that can be achieved is available, leading to the decrease in resources and efficiency.

SUMMARY OF THE INVENTION

An object of the present invention is to substantially solve at least the above problems and/or disadvantages and to provide at least the advantages below. Accordingly, an object of the present invention is to provide an apparatus and method for transmitting/receiving data in a multiple antenna diversity scheme in a mobile communication system.

Another object of the present invention is to provide an apparatus and method for transmitting/receiving data according to a channel status in a mobile communication system.

A further object of the present invention is to provide an apparatus and method for transmitting/receiving data in different transmission paths for an initial transmission and a retransmission in a mobile communication system.

The above objects are achieved by providing an apparatus and method for transmitting/receiving data using a multiple antenna scheme in a mobile communication system.

According to one aspect of the present invention, in a data transmitting apparatus of a mobile communication system having a first transmit antenna and a second transmit antenna, an encoder, upon receipt of a data symbol sequence, encodes the data symbol sequence in a predetermined encoding method and outputs first and second code symbol sequences. A controller controls transmission of the two code symbol sequences through the first and second transmit antennas such that if the data symbol sequence is initially transmitted, the first code symbol sequence is transmitted through the first transmit antenna and the second code symbol sequence is transmitted through the second transmit antenna and if the data symbol sequence is retransmitted, the first code symbol sequence is transmitted through the second transmit antenna and the second code symbol sequence is transmitted through the first transmit antenna.

According to another aspect of the present invention, in a data receiving apparatus of a mobile communication system having a first receive antenna and a second receive antenna, a first decoder generates a first data symbol sequence by decoding a signal received through the first receive antenna in a predetermined decoding method and a second decoder generates a second data symbol sequence by decoding a signal received through the second receive antenna in the predetermined decoding method. A controller controls demodulation of the first and second data symbol sequences such that if the first and second data symbol sequences are initially transmitted, the first symbol sequence is demodulated and if the first and second data symbol sequences are retransmitted, the second symbol sequence is demodulated.

According to a further aspect of the present invention, in a data transmitting method of a mobile communication system having a first transmit antenna and a second transmit antenna, a data symbol sequence for transmission is encoded in a predetermined encoding method and first and second code symbol sequences are output. Transmission of the two code symbol sequences through the first and second transmit antennas is controlled such that if the data symbol sequence is initially transmitted, the first code symbol sequence is transmitted through the first transmit antenna and the second code symbol sequence is transmitted through the second transmit antenna and if the data symbol sequence is retransmitted, the first code symbol sequence is transmitted through the second transmit antenna and the second code symbol sequence is transmitted through the first transmit antenna.

According to still another object of the present invention, in a data receiving method in a mobile communication system having a first receive antenna and a second receive antenna, a first data symbol sequence is generated by decoding a signal received through the first receive antenna in a predetermined decoding method and a second data symbol sequence is generated by decoding a signal received through the second receive antenna in the predetermined decoding method. Demodulation of the first and second data symbol sequences is controlled such that if the first and second data symbol sequences are initially transmitted, the first symbol sequence is demodulated and if the first and second data symbol sequences are retransmitted, the second symbol sequence is demodulated.

BRIEF DESCRIPTION OF THE DRAWINGS

The above and other objects, features and advantages of the present invention will become more apparent from the following detailed description when taken in conjunction with the accompanying drawings in which.

In the following description, well-known functions or constructions are not described in detail since they would obscure the invention in unnecessary detail.

DETAILED DESCRIPTION OF THE PREFERRED EMBODIMENT

An embodiment of the present invention will be described herein below with reference to the accompanying drawings.

The embodiment of the present invention provides an apparatus and method for implementing a multiple antenna diversity scheme in which multiple antennas are used according to a channel status in a mobile communication system, for example High Speed Downlink Packet Access (HSDPA). It should be obvious to those skilled in the art that the present invention is also applicable to any other mobile communication system that transmits data through a plurality of transmit antennas. While the present invention will be described in the context of Double Space Time Transmit Diversity (DSTTD), it is only for the purpose of explanation, and should not be viewed as a limitation of the present invention. In addition to DSTTD, the present invention can be implemented in any mobile communication system using a plurality of transmit antennas.

The structure of a transmitter in a mobile communication system using a multiple antenna diversity scheme according to an embodiment of the present invention will now be described with reference to FIG. 3.

Figure 1:
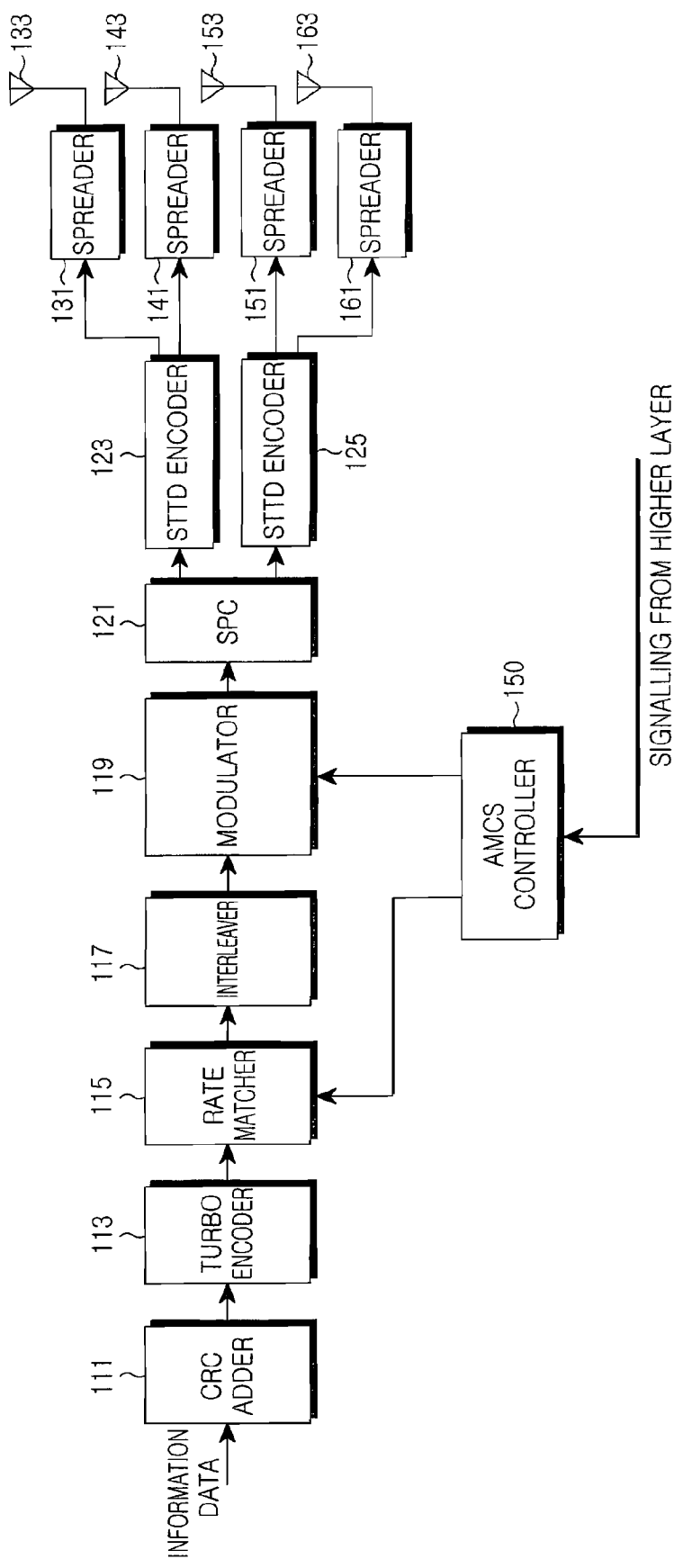
FIG. 1 is a block diagram of a transmitter in a mobile communication system using a conventional multiple antenna diversity scheme.
Figure 2:
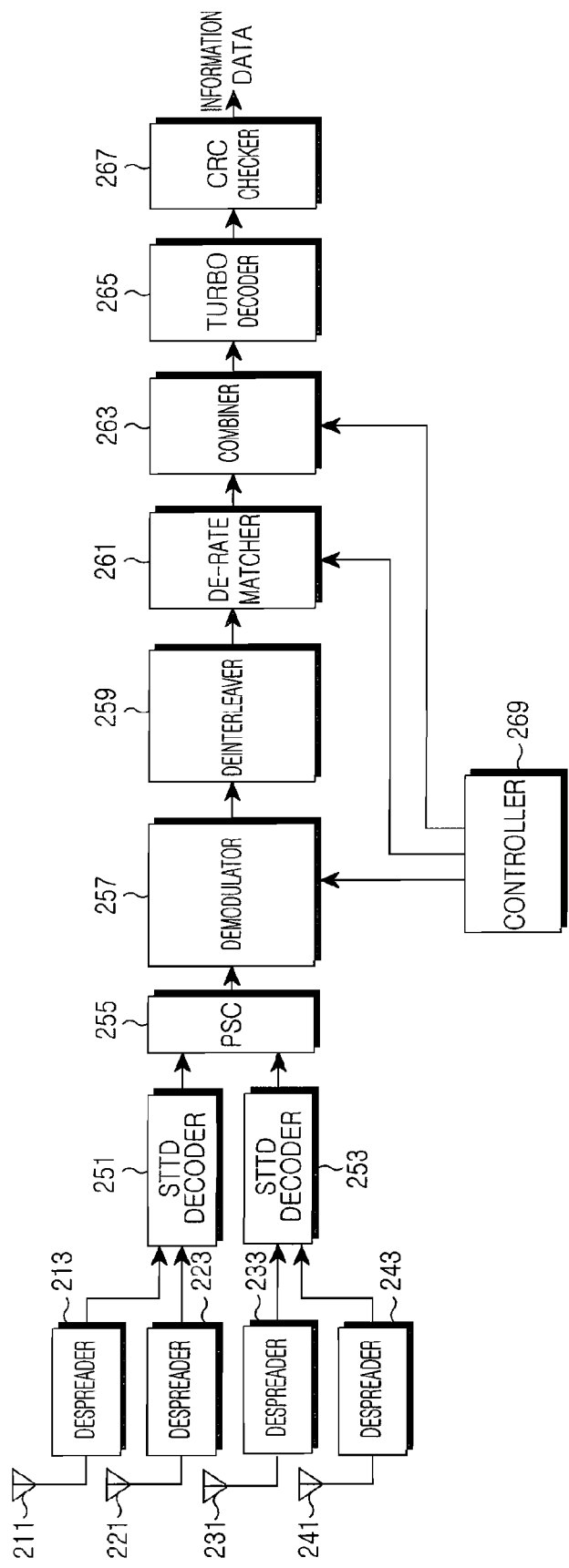
FIG. 2 is a block diagram of a receiver in the mobile communication system using a conventional multiple antenna diversity scheme.
Figure 3:
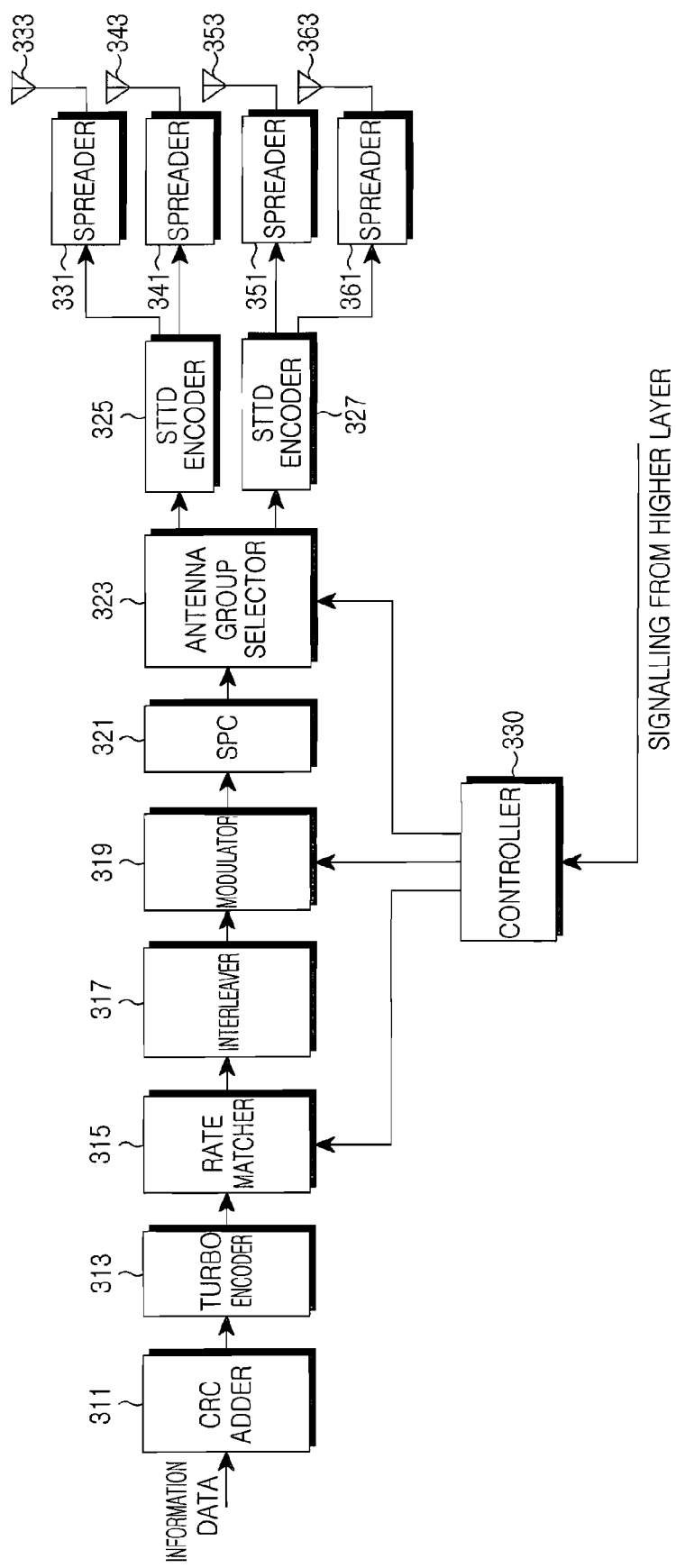
FIG. 3 is a block diagram of a transmitter in a mobile communication system using a multiple antenna diversity scheme according to an embodiment of the present invention.

FIG. 3 is a block diagram of a transmitter in a mobile communication system using a multiple antenna diversity scheme according to an embodiment of the present invention.

It is assumed herein that the transmitter supports DSTTD. DSTTD is an extension of Space Time Transmit Diversity (STTD) that offers a higher space diversity gain than STTD. Referring to FIG. 3, the transmitter comprises a Cyclic Redundancy Check (CRC) adder 311, a turbo encoder 313, a rate matcher 315, an interleaver 317, a modulator 319, a serial-to-parallel converter (SPC) 321, an antenna group selector 323, STTD encoders 325 and 327, a plurality of spreaders 331, 341, 351 and 361, a plurality of transmit antennas 333, 343, 353 and 363, and a controller 330.

For the input of information bits, the CRC adder 311 adds a CRC to the information bits, to perform an error check. The turbo encoder 313 turbo-encodes the signal received from the CRC adder 311. Obviously, if the mobile communication system uses an encoding method other than turbo encoding, for example convolutional encoding, the turbo encoder 313 is replaced by a convolutional encoder. The turbo encoder 313 encodes at a predetermined coding rate. The ratio between systematic bits and parity bits output from the turbo encoder 313 is determined according to the coding rate. For example, if the coding rate is a symmetric coding rate, ½ (r=½), the turbo encoder 313 outputs one systematic bit and one parity bit for the input of one bit. For another example, if the coding rate is an asymmetric coding rate, ¾ (r=¾), the turbo encoder 313 outputs three systematic bits and one parity bit for the input of three bits. Because the coding rate of the turbo encoder 313 is beyond the scope of the present invention, it should be obvious to those skilled in the art that the present invention can be implemented regardless of the coding rate and still be within the scope of the present invention.

The rate matcher 315 punctures or repeats the coded bits received from the turbo encoder according to the transmission capacity of a physical channel in the mobile communication system. The interleaver 317 interleaves the output of the rate matcher 315 in a predetermined interleaving method to prevent burst errors. The modulator 319 modulates the interleaved bits in a predetermined modulation scheme such as Binary Phase Shift Keying (BPSK), Quadrature Phase Shift Keying (QPSK), or 16 Quadrature Amplitude Modulation (16QAM). In 16QAM, four coded bits are mapped to one modulation symbol. In QPSK, two coded bits are mapped to one modulation symbol.

The SPC 321 converts a serial modulation symbol sequence to parallel symbol sequences. Specifically, the SPC 321 pairs every two modulation symbols received from the modulator 319 and provides every two modulation symbol pairs separately to the antenna group selector 323. The operation of the antenna group selector 323 will be described later. Parallel signals from the SPC 321 are applied to the STTD encoders 325 and 327, respectively. The operations of the SPC 321 and the STTD encoders 325 and 327 will be described later. The STTD encoder 325 encodes a code symbol pair received from the antenna group selector 323 in STTD and transmits the coded symbols to both the spreaders 331 and 341. The spreader 331 spreads the received symbols with a predetermined spreading code and transmits the spread symbols through the transmit antenna 333. The spreader 341 spreads the received symbols with a predetermined spreading code and transmits the spread symbols through the transmit antenna 343. The STTD encoder 327 encodes a code symbol pair received from the antenna group selector 323 in STTD and transmits the coded symbols to both the spreaders 351 and 361. The spreader 351 spreads the received symbols with a predetermined spreading code and transmits the spread symbols through the transmit antenna 353. The spreader 361 spreads the received symbols with a predetermined spreading code and transmits the spread symbols through the transmit antenna 363.

The controller 330 controls the operations of the rate matcher 315, the modulator 319, and the antenna group selector 323. The controller 330 determines a coding rate and a modulation scheme for the transmitter by considering the present radio channel status. For example, if the present radio channel status is relatively good, the controller 330 selects a higher coding rate and a higher-order modulation scheme, whereas if the present radio channel status is relatively bad, the controller 330 selects a lower coding rate and a lower-order modulation scheme. As stated earlier, because the coding rate of the turbo encoder 313 is fixed, the controller 330 controls the rate matcher 315 to match the number of the coded bits from the turbo encoder 313 to a coding rate determined in the controller 330. Also, the controller 330 controls the modulator 319 according to the selected modulation scheme. The controller 330 is aware of the radio channel status via signaling from a higher layer. In addition, the controller 330 controls data retransmission. If the signaling from the higher layer indicates data retransmission, the controller 330 retransmits data through an antenna group other than the one used for an initial transmission. A control operation of the controller 330 on the antenna group selector 323 for data retransmission will be described later.

A detailed description will be made below of the operations of the SPC 321 and the STTD encoders 325 and 327. The following description assumes that the antenna group selector 323 selects a leading code symbol pair between two code symbol pairs received from the SPC 321 for the STTD encoder 325, and a trailing code symbol pair for the STTD encoder 327.

Although the four modulation symbols from the modulator 319 are not shown they can be denoted as "$S_1$, $S_2$, $S_3$ and $S_4$". The SPC 321 parallelizes $S_1$, $S_2$, $S_3$ and $S_4$ and outputs $S_1$ and $S_2$ to the STTD encoder 325 and $S_3$ and $S_4$ to the STTD encoder 327. The STTD encoders 325 and 327 encode $S_1$ & $S_2$ and $S_3$ & $S_4$ in STTD. After the STTD encoding, $(S_1, S_2)$ are transmitted in the form of $(S_1, S_2)$ and $(-S_2^*, S_1^*)$ as illustrated in Table 3 below.

TABLE 3

|  | t | t + T |
|---|---|---|
| Transmit antenna 333 | $S_1$ | $S_2$ |
| Transmit antenna 343 | $-S_2^*$ | $S_1^*$ |

As noted in Table 3, by STTD encoding, the STTD encoder 325 transmits $S_1$ through the transmit antenna 333 and $-S_2^*$ through the transmit antenna 343 at time t, and transmits $S_2$ through the transmit antenna 333 and $S_1^*$ through the transmit antenna 343 at time (t+T).

After the STTD encoding, $(S_3, S_4)$ are transmitted in the form of $(S_3, S_4)$ and $(-S_4^*, S_3^*)$ as illustrated in Table 4 below.

TABLE 4

|  | t | t + T |
|---|---|---|
| Transmit antenna 353 | $S_3$ | $S_4$ |
| Transmit antenna 363 | $-S_4^*$ | $S_3^*$ |

As noted in Table 4, by STTD encoding, the STTD encoder 327 transmits $S_3$ through the transmit antenna 353 and $-S_4^*$ through the transmit antenna 363 at time t, and transmits $S_4$ through the transmit antenna 353 and $S_3^*$ through the transmit antenna 363 at time (t+T).

The signals from the STTD encoders 325 and 327 are transmitted to a receiver in correspondence with the transmitter through corresponding spreaders and corresponding transmit antennas. Upon receipt of an NACK signal indicating abnormal reception of the data, that is, requesting retransmission of the defective data from the receiver, the transmitter retransmits the defective data. The retransmission data is identical to the previous data, or it is parity bits which is generated from the same information bits but different from the parity bits included in the previous data. The kind of data that is retransmitted with regard to the previous data is determined according to a retransmission scheme adopted in the mobile communication system.

When the controller 330 recognizes the retransmission request, it controls the antenna group selector 323 to select an antenna group other than that used for transmission of the previous defective data. The previous data, STTD-encoded signals from $S_1$ and $S_2$ were transmitted through the transmit antennas 333 and 343 and STTD-encoded signals from $S_3$ and $S_4$ through the transmit antennas 353 and 363. Hereinafter, the transmit antennas 333 and 343 are collectively referred to as a first transmit antenna group and the transmit antennas 353 and 363 are collectively referred to as a second transmit antenna group. In effect, the STTD-encoded signals of $S_1$ and $S_2$ were transmitted through the first transmit antenna group and the STTD-encoded signals of $S_3$ and $S_4$ were transmitted through the second transmit antenna group. If the transmitter receives an NACK signal for the transmitted data from the receiver, this implies that the first or second antenna group is in a bad channel status. Determining that selection of the same transmit antenna group used previously would lead to transmission errors, the controller 330 selects an antenna group other than the one used for the previous transmission. That is, the controller 330 controls the antenna group selector 323 to select the second antenna group for the STTD-encoded signals of $S_1$ and $S_2$ and the first antenna group for the STTD-encoded signals of $S_3$ and $S_4$.

STTD-encoding of the modulation symbols $S_1$ & $S_2$ and $S_3$ & $S_4$ for retransmission will be described. Because the transmit antenna groups for the modulation symbol pairs are changed under the control of the controller 330 as described above, $S_1$ and $S_2$ output from the SPC 321 are applied to the input of the STTD encoder 327 and $S_3$ and $S_4$ output from the SPC 321 are applied to the input of the STTD encoder 325.

After the STTD encoding, $(S_1, S_2)$ are transmitted in the forms of $(S_1, S_2)$ and $(-S_2^*, S_1^*)$ as illustrated in Table 5 below.

TABLE 5

|  | t | t + T |
|---|---|---|
| Transmit antenna 353 | $S_1$ | $S_2$ |
| Transmit antenna 363 | $-S_2^*$ | $S_1^*$ |

As noted in Table 5, by STTD encoding, the STTD encoder 327 transmits $S_1$ through the transmit antenna 353 and $-S_2^*$ through the transmit antenna 363 at time t, and transmits $S_2$ through the transmit antenna 353 and $S_1^*$ through the transmit antenna 363 at time (t+T).

After the STTD encoding, $(S_3, S_4)$ are transmitted in the form of $(S_3, S_4)$ and $(-S_4^*, S_3^*)$ as illustrated in Table 6 below.

TABLE 6

|  | t | t + T |
|---|---|---|
| Transmit antenna 333 | $S_3$ | $S_4$ |
| Transmit antenna 343 | $-S_4^*$ | $S_3^*$ |

As noted in Table 6, by STTD encoding, the STTD encoder 325 transmits $S_3$ through the transmit antenna 333 and $-S_4^*$ through the transmit antenna 343 at time t, and transmits $S_4$ through the transmit antenna 333 and $S_3^*$ through the transmit antenna 343 at time (t+T).

The structure of the transmitter in the mobile communication system using the multiple antenna diversity scheme according to an embodiment of the present invention has been described above in connection with FIG. 3. Now, the structure of a receiver in the mobile communication system using the multiple antenna diversity scheme according to an embodiment of the present invention will be described with reference to FIG. 4.

Figure 4:
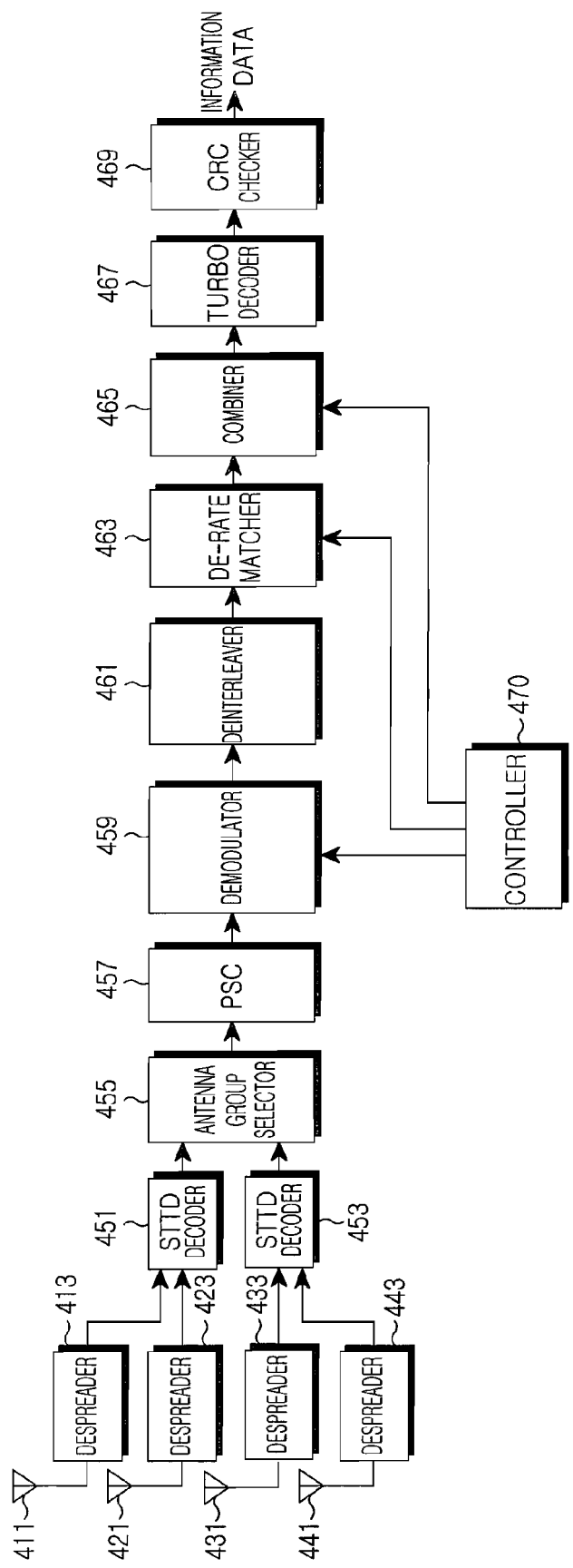
FIG. 4 is a block diagram of a receiver in the mobile communication system using the multiple antenna diversity scheme according to an embodiment of the present invention.

FIG. 4 is a block diagram of a receiver in the mobile communication system using the multiple antenna diversity scheme according to the embodiment of the present invention.

The receiver illustrated in FIG. 4 is configured in relation to the transmitter illustrated in FIG. 3 so that it can receive DSTTD signals from the transmitter. Referring to FIG. 4, the receiver comprises a plurality of receive antennas 411, 421, 431 and 441, a plurality of despreaders 413, 423, 433 and 443, STTD decoders 451 and 453, an antenna group selector 455, a PSC 457, a demodulator 459, a deinterleaver 461, a de-rate matcher 463, a combiner 465, a turbo decoder 467, and a CRC checker 469. While the receiver has the plurality of receive antennas 411, 421, 431 and 441, the embodiment of the present invention is not limited to the number of receive antennas. Therefore, it should be understood that the present invention is implemented irrespective of the number of receive antennas.

Signals received at the receive antennas 411, 421, 431 and 441 are applied to the input of the despreaders 413, 423, 433 and 443, respectively. That is, a signal received through the receive antenna 411 is provided to the despreader 413, a signal received through the receive antenna 421 is provided to the despreader 423, a signal received through the receive antenna 431 is provided to the despreader 433, and a signal received through the receive antenna 441 is provided to the despreader 443. The despreaders 413, 423, 433 and 443 despread their received signals with the spreading codes used in the spreaders of the transmitter.

The STTD decoder 451 decodes the despread signals received from the despreaders 413 and 423 in STTD, and the STTD decoder 453 decodes the despread signals received from the despreaders 433 and 443 in STTD. The operations in the STTD decoders 451 and 453 will be detailed below.

Because the transmitter transmits the four STTD-encoded symbols illustrated in Table 3 and Table 4 through the four transmit antennas as described with reference to FIG. 3, signals received at the receiver are expressed as $$r_1 = h_1 s_1 + h_2 s_2 + h_3 s_3 + h_4 s_4 + n_1$$

$$r_2 = -h_1 s_2^* + h_2 s_1^* - h_3 s_4^* + h_4 s_3 + n_2 \quad (5)$$

where $r_1$ and $r_2$ are signals received at corresponding time points, $h_1$, $h_2$, $h_3$ and $h_4$ are channel responses from the four respective transmit antennas, and $n_1$ and $n_2$ are AWGN.

The STTD decoder 451 decodes the received signals expressed as Eq. (5) in STTD and outputs signals expressed as $$\tilde{s}_1 = h_1^* r_1 + h_2 r_2^*$$

$$\tilde{s}_2 = h_2^* r_1 - h_1 r_2^* \quad (6)$$

and the STTD decoder 453 decodes the received signals expressed as Eq. (5) in STTD and outputs signals expressed as $$\tilde{s}_3 = h_3^* r_3 + h_4 r_4^*$$

$$\tilde{s}_4 = h_4^* r_3 - h_3 r_4^* \quad (7)$$

Eq. (6) and Eq. (7) are developed to $$\tilde{s}_1 = (\alpha_1^2 + \alpha_2^2) s_1 + n_1'$$

$$\tilde{s}_2 = (\alpha_1^2 + \alpha_2^2) s_2 + n_2'$$

$$\tilde{s}_3 = (\alpha_3^2 + \alpha_4^2) s_3 + n_3'$$

$$\tilde{s}_4 = (\alpha_3^2 + \alpha_4^2) s_4 + n_4' \quad (8)$$

where n is a noise component and $\alpha_j$ is a diversity gain obtained from a jth transmit antenna.

It is noted in Eq. (8) that signal components are separated from noise components and four signal components having diversity gains, $\tilde{s}_1, \tilde{s}_2, \tilde{s}_3, \tilde{s}_4$ are received.

Consequently, the STTD decoder 451 outputs $\tilde{s}_1$ and $\tilde{s}_2$ and the STTD decoder 453 outputs $\tilde{s}_3$ and $\tilde{s}_4$. Therefore, the antenna group selector 455 determines which one of the outputs of the STTD decoders 451 and 453 to first transmit to the PSC 457 under the control of a controller 470. As described with reference to FIG. 3, assuming that the transmitter transmitted initial data, the antenna group selector 455 outputs the signal received from the STTD decoder 451 to the PSC 457 earlier than the signal received from the STTD decoder 453.

The PSC 457 serializes the signal received from the antenna group selector 455 and outputs $\tilde{s}_1, \tilde{s}_2, \tilde{s}_3, \tilde{s}_4$ to the demodulator 459. The demodulator 459 demodulates the received signal in relation to the modulation scheme used in the transmitter. The deinterleaver 461 deinterleaves the demodulated bits in relation to the interleaving method used in the transmitter. The de-rate matcher 463 de-rate matches the deinterleaved bits in relation to the rate matching performed in the transmitter.

The combiner 465 combines the present coded bits received from the de-rate matcher 463 with an already stored version of the coded bits. This indicates that data initially transmitted from the transmitter had errors and was not received normally. Therefore, if the receiver requests a retransmission and the transmitter retransmits the data, the retransmitted data is combined with the previous defective data in the combiner 465. If the present data is initial transmission data, the coded bits bypass the combiner 465 without being combined. The turbo decoder 467 turbo-decodes the signal received from the combiner 465 in relation to the turbo encoding performed in the transmitter. The turbo decoder 467 receives coded bits, that is, systematic bits and parity bits from the combiner 263 and decodes the systematic bits. The CRC checker 469 extracts CRC bits from the systematic bits (i.e. information bits) received from the turbo decoder 467 on a packet basis and determines whether the packet has errors based on the CRC bits. Determining that no errors occurred in the packet, the CRC checker 469 outputs the packet and transmits an ACK signal for the packet to the transmitter, indicating normal reception of the packet. If the CRC check result indicates an occurrence of errors in the packet, the CRC checker 469 transmits a NACK signal to the transmitter, requesting a retransmission of the defective packet.

If the CRC checker 469 outputs the ACK signal, a buffer in the combiner 465 is initialized, while coded bits stored in the buffer are deleted. On the other hand, if the CRC checker 469 outputs the NACK signal, the coded bits remain in the buffer of the combiner 465.

Since the above description is made under the assumption of an initial data transmission, no coded bits remain in the buffer of the combiner 465. If the initial transmission data has errors, the receiver transmits a NACK signal to the transmitter, requesting retransmission of the defective data. Then, the transmitter retransmits the initial transmission data. For the data retransmission, the transmitter selects a transmit antenna group other than that used for the initial transmission. That is, the transmitter retransmits the data in the manner as described in connection with Table 5 and Table 6.

Because the transmitter transmits the four STTD-encoded symbols illustrated in Table 5 and Table 6 through the four transmit antennas as described with reference to FIG. 3, signals received at the receiver are expressed as $$r_1 = h_1 s_3 + h_2 s_4 + h_3 s_1 + h_4 s_2 + n_1$$

$$r_2 = -h_1 s_4^* + h_2 s_3^* - h_3 s_2^* + h_4 s_1^* + n_2 \quad (9)$$

The STTD decoder 451 decodes the received signals expressed as Eq. (9) in STTD and outputs signals expressed as $$\tilde{s}_1 = h_3^* r_1 + h_4 r_2^*$$

$$\tilde{s}_2 = h_4^* r_1 - h_3 r_{2*} \quad (10)$$

and the STTD decoder 453 decodes the received signals expressed as Eq. (9) in STTD and outputs signals expressed as $$\tilde{s}_3 = h_1^* r_3 + h_2 r_4^*$$

$$\tilde{s}_4 = h_2^* r_3 - h_1 r_{4*} \quad (11)$$

Eq. (10) and Eq. (11) are developed to $$\tilde{s}_1 = (\alpha_3^2 + \alpha_4^2) s_1 + n_1''$$

$$\tilde{s}_2 = (\alpha_3^2 + \alpha_4^2) s_2 + n_2''$$

$$\tilde{s}_3 = (\alpha_1^2 + \alpha_2^2) s_3 + n_3''$$

$$\tilde{s}_4 = (\alpha_1^2 + \alpha_2^2) s_4 + n_4'' \quad (12)$$

Because the initial transmission data exists in the buffer of the combiner 465, a combined signal in the combiner 465 is $$\tilde{s}_1 = (\alpha_1^2 + \alpha_2^2 + \alpha_3^2 + \alpha_4^2) s_1 + n_1''$$

$$\tilde{s}_2 = (\alpha_1^2 + \alpha_2^2 + \alpha_3^2 + \alpha_4^2) s_2 + n_2''$$

$$\tilde{s}_3 = (\alpha_1^2 + \alpha_2^2 + \alpha_3^2 + \alpha_4^2) s_3 + n_3''$$

$$\tilde{s}_4 = (\alpha_1^2 + \alpha_2^2 + \alpha_3^2 + \alpha_4^2) s_4 + n_4'' \quad (13)$$

As noted in Eq. (13), selection of a transmit antenna group (i.e. channel status) for retransmitting ($S_1$, $S_2$) and ($S_3$, $S_4$), other than that for initially transmitting ($S_1$, $S_2$) and ($S_3$, $S_4$) increases efficiency in diversity gain in embodiment of the present invention. Diversity gains are achieved from ($S_1$, $S_2$) and ($S_3$, $S_4$) by $\alpha_1\alpha_2$ and $\alpha_3\alpha_4$, respectively in the conventional method, whereas diversity gains are achieved from both ($S_1$, $S_2$) and ($S_3$, $S_4$) by $\alpha_1\alpha_2\alpha_3\alpha_4$ in the present invention. Thus, the embodiment of the present invention offers excellent performance in terms of diversity gain.

Figure 5:
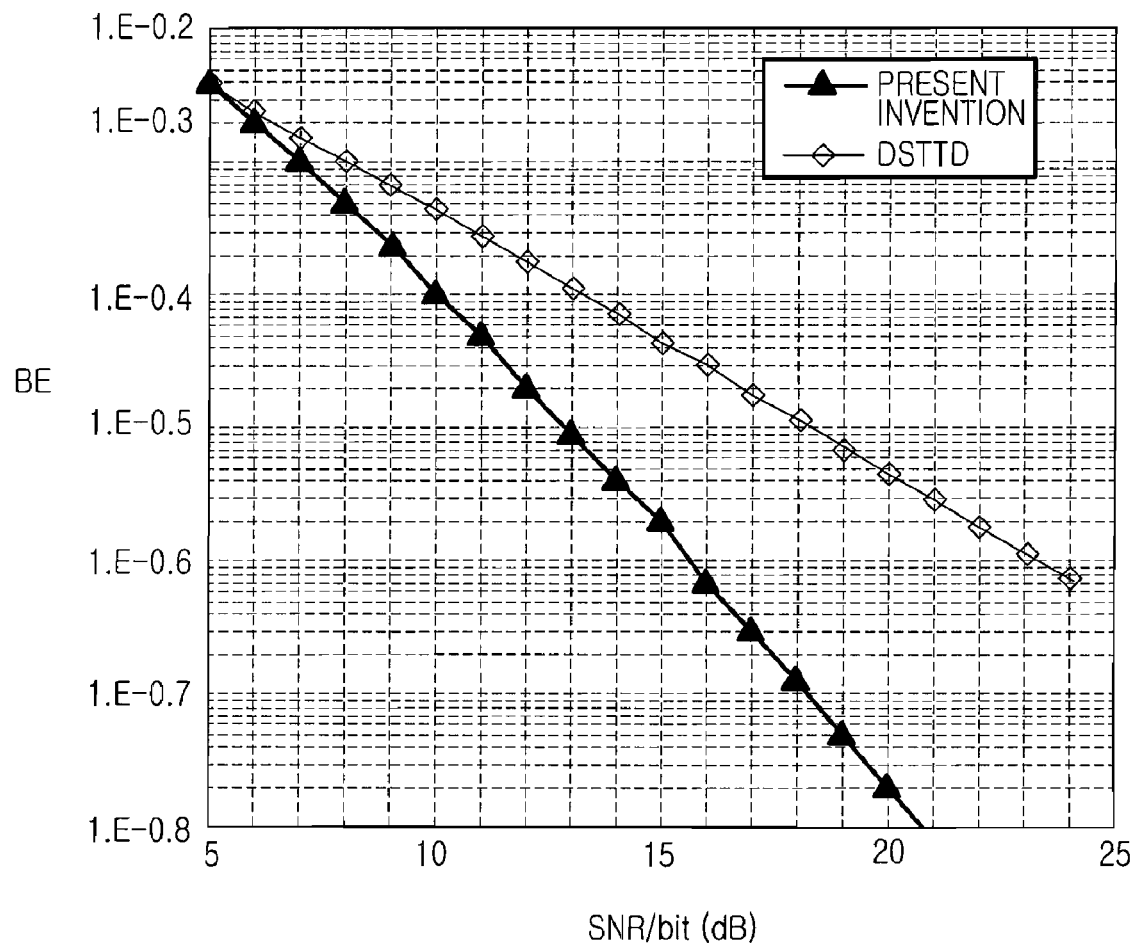
FIG. 5 is a graph illustrating a comparison in diversity gain between the conventional multiple antenna diversity scheme and the multiple antenna diversity scheme in accordance with an embodiment of the present invention.

With reference to FIG. 5, diversity gains achieved from the conventional method and the present invention will be compared.

FIG. 5 is a graph illustrating diversity gains in the typical multiple antenna diversity scheme and the multiple antenna diversity scheme in accordance with an embodiment of the present invention.

As illustrated in FIG. 5, a comparison in probability of bit error (BE) versus Signal to Noise Ratio (SNR) per bit (SNR/bit) between the typical DSTTD and the STTD of the present invention reveals that the STTD of the present invention produces better performance.

In accordance with an embodiment of the present invention as described, a mobile communication system using a multiple antenna diversity scheme maximizes diversity gain by transmitting data according to a channel status. Thus, space diversity resource efficiency is maximized and, as a result, the whole system performance is improved.

While an embodiment of the present invention has been described in the context of antenna switching of modulation symbol pairs ($S_1$, $S_2$) and ($S_3$, $S_4$) at an initial transmission and a retransmission, it is a mere exemplary application. Obviously, many modifications can be made to a combination of transmission data pairs. In addition, the antenna switching method can be implemented in various ways. For example, antenna switching is performed at each retransmission or according to the number of retransmission requests. Also, the embodiment of the present invention can be effective implemented when four or more transmit antennas are used. It should be understood that the gain offered by the present invention can also be achieved by assigning different transmission symbols to each transmit antenna at each retransmission, that is, giving a different antenna weight to symbols at each retransmission in a Transmit Antenna Array (TxAA) scheme or any other transmit diversity scheme as well as the STTD scheme.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A data transmitting apparatus in a mobile communication system comprising at least two antenna groups composed of at least two antennas, comprising:
   a first encoder and a second encoder for encoding a data symbol sequence in a predetermined encoding method and outputting an encoding data symbol sequence; and
   a controller for controlling input of the first data symbol sequence to the first encoder and transmission of the first data symbol sequence through a first antenna group, and input of the second data symbol sequence to the second encoder and transmission of the second data symbol sequence through a second antenna group during a first transmission,
   wherein the controller is for controlling input of the first data symbol sequence to the second encoder and transmission of the first data symbol sequence through the second antenna group, and input of the second data symbol sequence to the first encoder and transmission of the second data symbol sequence through the first antenna group during a second transmission.

2. The data transmitting apparatus of claim 1, wherein the encoders use space time transmit diversity (STTD) encoding or transmit antenna array (TxAA) encoding.

3. The data transmitting apparatus of claim 1, wherein the first transmission is an initial transmission and the second transmission is a transmission in response to a request to retransmit the first and second data symbol sequences.

4. A data transmitting method in a mobile communication system comprising at least two antenna groups composed of at least two antennas, the method comprising:
   encoding a data symbol sequence in a predetermined encoding method and outputting encoded data symbol sequence at a first encoder and a second encoder;
   inputting the first data symbol sequence to the first encoder and transmitting the first data symbol sequence through a first antenna group, and inputting the second data symbol sequence to a second encoder and transmitting the second data symbol sequence through a second antenna group during a first transmission; and inputting the first data symbol sequence to the second encoder and transmitting the first data symbol sequence through the second antenna group, and inputting the second data symbol sequence to the first encoder and transmitting the second data symbol sequence through the first antenna group during a second transmission.

5. The data transmitting method of claim 4, wherein the encoding method comprises a space time transmit diversity (STTD) encoding or a transmit antenna array (TxAA) encoding.

6. The data transmitting method of claim 4, wherein the first transmission is an initial transmission and the second transmission is a transmission in response to a request to retransmit the first and second data symbol sequences.

7. A transmitted data receiving apparatus in a mobile communication system comprising at least two antenna groups composed of at least two antennas, comprising:
    a first decoder and a second decoder for decoding a data symbol sequence transmitted from the at least two antenna groups in a predetermined decoding method and outputting a decoded data symbol sequence; and
    a controller for controlling input of the first data symbol sequence to the first decoder and input of the second data symbol sequence to the second decoder during a first transmission,
    wherein the controller is for controlling input of the first data symbol sequence to the second decoder, and input of the second data symbol sequence to the first decoder during a second transmission.

8. The data receiving apparatus of claim 7, wherein the decoders use space time transmit diversity (STTD) decoding or transmit antenna array (TxAa) decoding.

9. The data receiving apparatus of claim 7, wherein the first transmission is an initial transmission and the second transmission is a transmission in response to a request to retransmit the first and second data symbol sequences.

10. A transmitted data receiving method in a mobile communication system comprising at least two antenna groups composed of at least two antennas, the method comprising:
    decoding a data symbol sequence transmitted from the at least two antenna groups in a predetermined decoding method and outputting a decoded data symbol sequence at a first decoder and a second decoder;
    inputting the first data symbol sequence to the first decoder; and inputting the second data symbol sequence to the second decoder during a first transmission; and
    inputting the first data symbol sequence to the second decoder and inputting the second data symbol sequence to the first decoder during a second transmission.

11. The data receiving method of claim 10, wherein the decoding method comprises a space time transmit diversity (STTD) decoding or a transmit antenna array (TxAA) decoding.

12. The data receiving method of claim 10, wherein the first transmission is an initial transmission and the second transmission is a transmission in response to a request to retransmit the first and second data symbol sequences.

13. A data receiving apparatus in a mobile communication system having a first receive antenna group with first and second receive antennas and a second receive antenna group with third and fourth receive antennas, comprising:
    a first decoder for generating first and second data symbol sequences by decoding a signal received through the first receive antenna group in a predetermined decoding method;
    a second decoder for generating third and fourth data symbol sequences by decoding a signal received through the second receive antenna group in the predetermined decoding method; and
    a controller for controlling demodulation of the first, second, third and fourth data symbol sequences such that if the data symbol sequences are initially transmitted, demodulation of the first and second data symbol sequences precedes demodulation of the third and fourth data symbol sequences,
    wherein if the data symbol sequences are retransmitted, the demodulation of the third and fourth data symbol sequences precedes demodulation of the first and second data symbol sequences.

14. The data receiving apparatus of claim 13, wherein the decoders use a space time transmit diversity (STTD) decoding or a transmit antenna array (TxAA) decoding.

* * * * *